United States Patent [19]
Endo et al.

[11] Patent Number: 5,267,633
[45] Date of Patent: Dec. 7, 1993

[54] ELECTRORHEOLOGICAL FLUID-APPLIED APPARATUS, ELECTRORHEOLOGICAL FLUID-APPLIED VIBRATION CONTROLLER, AND ELECTRORHEOLOGICAL FLUID-APPLIED FIXING APPARATUS

[75] Inventors: Shigeki Endo, Tokorozawa; Yuichi Ishino, Fuchu; Tasuku Saito, Tokorozawa, all of Japan

[73] Assignee: Bridgestone Corporation, Japan

[21] Appl. No.: 831,677

[22] Filed: Feb. 5, 1992

[30] Foreign Application Priority Data

Feb. 15, 1991 [JP] Japan ............................. 3-22305

[51] Int. Cl.⁵ ............................................. F16F 15/03
[52] U.S. Cl. ................................. 188/267; 267/136; 248/550; 248/636
[58] Field of Search ............ 188/267, 311, 312, 322.5, 188/279; 267/64.23, 64.24, 140.14, 140.15, 136; 248/550, 566, 636

[56] References Cited

U.S. PATENT DOCUMENTS

| | | | |
|---|---|---|---|
| 3,986,411 | 10/1976 | Kirby | 188/322.5 X |
| 4,679,775 | 7/1987 | Funaki et al. | 188/267 X |
| 4,773,632 | 9/1988 | Hartel | 188/267 X |
| 4,921,272 | 5/1990 | Ivers | 267/136 X |
| 5,020,781 | 6/1991 | Huang | 267/136 |

FOREIGN PATENT DOCUMENTS

| | | | |
|---|---|---|---|
| 0023139 | 2/1984 | Japan | 248/566 |
| 61-2966 | 1/1986 | Japan | . |
| 62-113935 | 5/1987 | Japan | . |
| 62-113936 | 5/1987 | Japan | . |
| 63-72934 | 4/1988 | Japan | . |
| 63-265715 | 11/1988 | Japan | . |
| 1-119377 | 5/1989 | Japan | . |
| 0245532 | 10/1990 | Japan | 188/322.5 |

*Primary Examiner*—Robert J. Oberleitner
*Assistant Examiner*—Peter M. Poon
*Attorney, Agent, or Firm*—Oliff & Berridge

[57] ABSTRACT

A positive electrode and a negative electrode are disposed in face-to-face relation to allow a distance between the electrodes to change, and an electrorheological fluid is filled between the electrodes. When an external force is applied to the electrorheological fluid via the electrodes, a normal stress occurs in the electrorheological fluid. This normal stress is greater than a shearing stress occurring in the electrorheological fluid, and an area in which displacement is proportional to the stress is large. Hence, the electrorheological fluid is applicable to various apparatuses such as a vibration controller and a fixing apparatus.

14 Claims, 8 Drawing Sheets

□ : STRESS IN NORMAL DIRECTION
+ : STRESS IN SHEARING DIRECTION

← COMPRESSIVE DEFORMATION | TENSILE DEFORMATION →

ELECTRORHEOLOGICAL FLUID-APPLIED APPARATUS, ELECTRORHEOLOGICAL FLUID-APPLIED VIBRATION CONTROLLER, AND ELECTRORHEOLOGICAL FLUID-APPLIED FIXING APPARATUS

BACKGROUND OF THE INVENTION

1. Field of the Invention

The present invention relates to an electrorheological fluid-applied apparatus in which the characteristics of an electrorheological fluid are utilized very efficiently, and also relates to an electrorheological fluid-applied vibration controller and an electrorheological fluid-applied fixing apparatus which are included among the types of electrorheological fluid-applied apparatus.

2. Description of the Related Art

As applied apparatuses making use of an electrorheological fluid, or an electroviscous fluid, whose viscosity changes upon application of a voltage thereto, a vibration isolating apparatus is disclosed in Japanese Patent Application Laid-Open No. 63-72934, and a suspension is disclosed in Japanese Patent Application Laid-Open No. 63-265715. In these applied apparatuses, the viscosity of a fluid in an electrode orifice is changed by applying a voltage to the orifice provided in a hermetically sealed fluid chamber, so as to control the mechanical properties of the apparatus concerned. In addition, Japanese Patent Application Laid-Open Nos. 62-113935 and 62-113936 disclose spring elements. Furthermore, Japanese Patent Application Laid-Open No. 61-2966 discloses an electrorheological fluid clutch in which an input shaft is coupled with an output shaft via an electrorheological fluid and which is capable of changing the torque transmission efficiency upon application of a voltage to the electrorheological fluid. Also, Japanese Patent Application Laid-Open No. 1-119377 discloses a vibrating apparatus using an electroviscous valve.

In each of the conventional apparatuses typified by the aforementioned apparatuses, control is effected by making use of a phenomenon in which the viscosity of an electrorheological fluid changes in response to a change in the applied voltage, i.e., a phenomenon in which a shearing stress appearing in an electrode portion changes in response to a change in the applied voltage.

At the present stage, it is difficult to say that the change in the shearing stress in response to the applied voltage has reached a level required of the aforementioned applied apparatuses. For this reason, the application of the electrorheological fluid is quite limited. In addition, since the change in the shearing stress of the electrorheological fluid occurring between electrodes is very small in an area where deformation in the shearing direction is very small, it has been difficult to apply the electrorheological fluid to control very small vibrations.

SUMMARY OF THE INVENTION

Accordingly, it is a primary object of the present invention to provide an electrorheological fluid-applied apparatus which is applicable to various fields by remarkably increasing the stress appearing in an electrorheological fluid when an external force has acted thereon and by creating a large change in stress even when the deformation is very small.

A second object of the present invention is to provide an electrorheological fluid-applied vibration controller in which the aforementioned electrorheological fluid-applied apparatus is applied to control of vibrations such as for attenuation of vibrations.

A third object of the present invention is to provide an electrorheological fluid-applied fixing apparatus in which the aforementioned electrorheological fluid-applied apparatus is applied to a fixing apparatus.

To attain the primary object of the invention, the electrorheological fluid-applied apparatus in accordance with a first aspect of the invention comprises: a positive electrode and a negative electrode disposed in face-to-face relationship, at least one of the positive electrode and the negative electrode being displaceable in a direction in which a distance between the electrodes changes; voltage applying means for applying a voltage across the positive and negative electrodes; and an electrorheological fluid disposed between the positive and negative electrodes and adapted to undergo a change in a characteristic of its own when the voltage is applied across the positive and negative electrodes, so as to control a change in the distance between the electrodes by means of a normal stress occurring in the electrorheological fluid as a result of the action of an external force thereon.

To attain the second object of the invention, the electrorheological fluid-applied vibration controller in accordance with a second aspect of the invention comprises: a positive electrode and a negative electrode disposed in face-to-face relationship, at least one of the positive electrode and the negative electrode being displaceable in a direction in which a distance between the electrodes changes; voltage applying means for applying a voltage across the positive and negative electrodes; and an electrorheological fluid disposed between the positive and negative electrodes and adapted to undergo a change in a characteristic of its own when the voltage is applied across the positive and negative electrodes, so as to transmit an external force from one of the positive and negative electrodes to the other by means of a normal stress occurring in the electrorheological fluid as a result of the action of the external force thereon.

To attain the third object of the invention, the electrorheological fluid-applied fixing apparatus in accordance with a third aspect of the invention comprises: a positive electrode and a negative electrode disposed in face-to-face relationship, at least one of the positive electrode and the negative electrode being displaceable in a direction in which a distance between the electrodes changes; voltage applying means for applying a voltage across the positive and negative electrodes; and an electrorheological fluid disposed between the positive and negative electrodes and adapted to undergo a change in a characteristic of its own when the voltage is applied across the positive and negative electrodes, so as to hold in opposition to an external force acting on the electrorheological fluid a relative position of one of the positive and negative electrodes with respect to the other by means of a normal stress occurring in the electrorheological fluid as a result of the action of the external force thereon.

In accordance with the present invention, the aforementioned objects are attained by taking note of conventionally utterly unknown basic principles that a change in a physical property of an electrorheological fluid in a direction perpendicular, i.e., normal, to an electrode surface when a voltage is applied thereto is appreciably large as compared with a conventionally known change in the physical property in the shearing direction (in a direction parallel with the electrode surface), and that a sufficiently large stress appears even with respect to a very small deformation.

More specifically, the present inventors discovered that upon application of a voltage to an electrorheological fluid, the electrorheological fluid exhibits elastic behavior similar to that of rubber with respect to a very small deformation in a direction perpendicular, i.e., normal, to the electrode surface, and that a modulus of elasticity thereof assumes a very large value. For instance, after application of a voltage across positive and negative electrodes, if the electrodes are moved close to or away from each other, a restoring force for returning the electrodes to their original relative position occurs in the electrorheological fluid. Accordingly, if this characteristic is made use of, the electrorheological fluid can be applied to various fields.

FIG. 8 is a graph showing stress-strain curves (a restoring force with respect to a forced deformation of a predetermined amount; hereafter the same) in the normal direction and in the shearing direction, respectively, of the electrorheological fluid in accordance with the present invention. The electrorheological fluid used in the present invention was obtained as follows: After coal tar was subjected to heat treatment at 450° C., the processed material was extracted and filtered in a tar-based middle oil, and the residue was subjected again to heating at 520° C. The resultant carbonaceous powders were pulverized and graded, and after being adjusted to an average particle diameter of 5 microns, the powders were dispersed in a silicone oil (manufactured by Toshiba Silicone Co., Ltd.: TSF451-10) with the volume ratio of the powders being 26%.

FIG. 8 shows both an example of a stress-strain curve at a time when a voltage was applied to this electrorheological fluid in such a manner that the electric field length became 2 kV/mm so as to cause the electrodes to be displaced relative to each other in the normal direction, as well as an example of a stress-strain curve at a time when the electrodes were displaced in the shearing direction under the same conditions. It can be appreciated from the graph in FIG. 8 that, with respect to deformation in the shearing direction of the electrorheological fluid occurring when the electrodes were displaced in the shearing direction, no proportional area in the stress-strain behavior was noted, and the stress which appeared was only 0.5 kPa. With respect to the normal direction, however, the electrorheological fluid exhibited the behavior of an elastic material in accordance with Hooke's law with respect to a strain of 2% or less in both the tensile deformation and the compressive deformation, and that the modulus of elasticity, i.e., the stress/strain, reaches approximately 100 kPa at the time of, for instance, a 2% deformation. Thus it can be appreciated that the electrorheological fluid as a liquid becomes more rigid in the normal direction.

In addition, the present inventors discovered that, by changing the voltage applied to the electrorheological fluid, it is possible to increase a proportional area in which the stress and strain appearing in the normal direction are proportional with respect to the relative displacement of the electrodes. FIG. 9 shows the relationship between the proportional area and the electric field strength of a voltage applied to the electrorheological fluid. As is evident from FIG. 9, by increasing the electric field strength, the proportional area increases, thereby making it possible to control the normal stress appearing in the electrorheological fluid and facilitate the use thereof.

Furthermore, the present inventors discovered that in a case where the electrorheological fluid is made to undergo the tensile deformation in the normal direction beyond a limit of proportion of the stress-strain behavior, a maximum value of the normal stress reaches as much as 20-fold that of the shearing stress. That is, FIG. 10 shows changes in the stress with respect to the magnitude of displacement at a time when the electric field strength of the electrorheological fluid was 3 kV/mm. Table 1 below shows a comparison between a maximum normal stress obtained from this stress-strain curve and shear stresses under the same conditions with respect to various electric field strengths.

TABLE 1

| Electric Field Strength | Shear Stress | Normal Stress |
| --- | --- | --- |
| 1 kV/mm | 77 Pa | 1660 Pa |
| 2 kV/mm | 296 Pa | 6270 Pa |
| 3 kV/mm | 480 Pa | 9940 Pa |

In Table 1, the normal stress at an electric field strength of 3 kV/mm is 9940 Pa, which is approximately 20-fold with respect to 480 Pa for the shear stress.

Table 2 below shows the maximum normal stress and shear stress at an electric field strength of 2 kV/mm at a time when the volume ratio of the carbonaceous powders in the electrorheological fluid was changed. In both powder concentrations, normal stresses which are approximately 20-fold the shear stresses are obtained.

TABLE 2

| Powder Concentration | Shear Stress | Normal Stress |
| --- | --- | --- |
| 10 vol. % | 61 Pa | 960 Pa |
| 20 vol. % | 200 Pa | 4400 Pa |
| 30 vol. % | 412 Pa | 8580 Pa |

FIG. 11 shows the relationship between the electric field strength and the stress appearing at the time of a maximum deformation when the electrorheological fluid was interposed between a pair of electrode plates arranged in face-to-face relation such that the electrode surfaces became parallel, a voltage was applied to the electrorheological fluid between the electrode plates, and vibrations of 1 Hz were imparted to the electrode surfaces in the normal direction at a one-side amplitude of 1% and 3%. As is evident from FIG. 11, by changing the electric field strength imparted to the electrorheological fluid, it becomes possible to control over a wide range the stress appearing in the electrorheological fluid in the normal direction with respect to the relative displacement of the electrodes.

Accordingly, in order to make use of the basic principle of the action of the normal stress, the object is attained by interposing the electrorheological fluid between the positive electrode and the negative electrode, by rendering the distance between the positive and negative electrodes changeable, and by allowing a voltage to be applicable between the positive and negative electrodes. In this arrangement, if a voltage is applied between the positive and negative electrodes, the characteristic of the electrorheological fluid changes, a normal stress occurs as a result of the action of an external force to the electrorheological fluid, and the change in the distance between the electrodes can be controlled by means of this normal stress. It should be noted that, to render the distance between the electrodes changeable, it suffices if one or both of the positive and negative electrodes are rendered displaceable in the direction in which the distance between the electrodes changes.

In addition, an electrorheological fluid-applied vibration controller can be provided by using the above-described structure, by connecting a vibration generating portion and a vibration receiving portion to the positive electrode and the negative electrode, respectively, and by causing an external force acting on one electrode to be transmitted to the other electrode via the electrorheological fluid. For instance, such vibration controllers include vibration attenuators (particularly a very-small-vibration attenuator), shock absorbers (a high-damping-force damper, a combination damper combining the action of the normal stress and the action of the shear stress, a functional damper having anisotropy in its elastic property, and the like), and vibration eliminators (particularly a vibration eliminating table).

Moreover, if the present invention is applied to the electrorheological fluid-applied fixing apparatus capable of fixing the relative movement of the positive electrode and the negative electrode spaced apart from each other via the electrorheological fluid, the present invention is applicable to various apparatuses including a pick-and-place type robot, a fixing apparatus for a structural support or the like, a smart material handler capable of controlling a characteristic frequency, and a clutch for engagement or disengagement of a torque or the like.

As described above, in accordance with the present invention, since use is made of the stress in the normal direction appearing in the electrorheological fluid upon application of a voltage between the positive and negative electrodes when an external force is applied thereto, the invention can be applied to apparatuses in various fields.

The above and other objects, features and advantages of the invention will become more apparent from the following detailed description of the invention when read in conjunction with the accompanying drawings.

DESCRIPTION OF THE PREFERRED EMBODIMENTS

Figure 1:
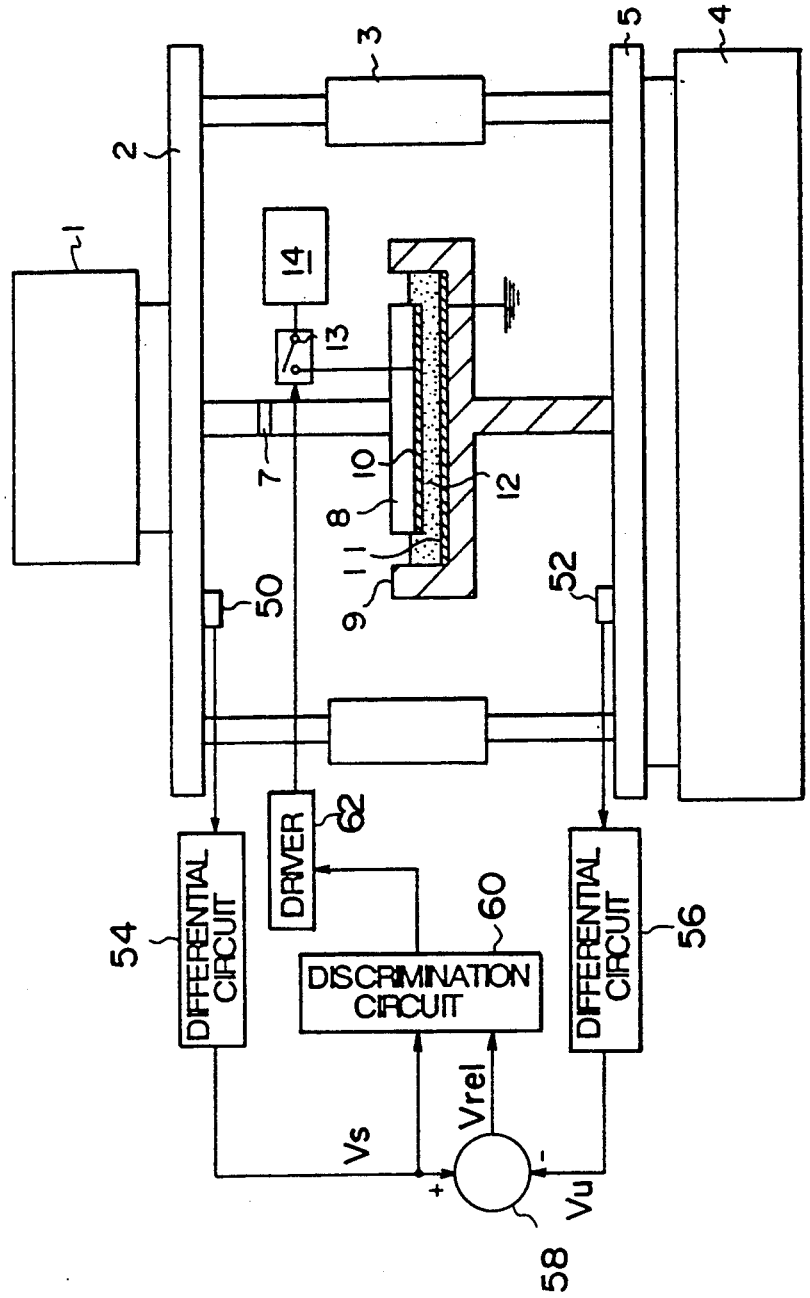
FIG. 1 is a schematic diagram of an embodiment in which an electrorheological fluid-applied vibration controller in accordance with the present invention is applied to a vibration attenuator.

FIG. 1 is a schematic diagram illustrating an embodiment in which an electrorheological fluid-applied apparatus in accordance with the present invention is applied to a vibration attenuator as a electrorheological attenuator is provided with a movably supporting portion 2 for supporting a member 1 to be supported and serving as a vibration receiving portion for receiving the vibrations of a vehicle engine, a vibration source, or the like, a fixedly supporting portion 5 secured to a base 4 serving as a vibration generating portion, and resiliently supporting members 3 for connecting the movably supporting portion 2 and the fixedly supporting portion 5.

A piston 8 is connected to the movably supporting portion 2 via an insulator 7, and a damper case 9 is secured to the fixedly supporting portion 5. A positive electrode plate 10 and a negative electrode plate 11 are respectively provided on the opposing surfaces of the piston 8 and the damper case 9, and an electrorheological fluid 12 is filled in a gap between the piston 8 and the damper case 9. The positive electrode plate 10 is electrically connected to a dc power source 14 via a switch 13, and the negative electrode plate 11 is grounded. A displacement sensor 50 for detecting the displacement of the member 1 to be supported is attached to the movably supporting portion 2, while a displacement sensor 52 for detecting the displacement of the base 4 is attached to the fixedly supporting portion 5. It should be noted that the displacement sensors 50, 52 maybe mounted directly on the member 1 to be supported and the base 4, respectively. The displacement sensor 50 is connected to a differential circuit 54, and the displacement sensor 52 is connected to a differential circuit 56. An output terminal of the differential circuit 54 is connected to an adder 58 and also to a discrimination circuit 60, while an output terminal of the differential circuit 56 is connected to the adder 58. The output terminal of the adder 58 is connected to the discrimination circuit 60. The discrimination circuit 60, in turn, is connected to the switch 13 via a driver 62. This discrimination circuit 60 discriminates a code representing the product of the output of the differential circuit 54 and the output of the adder 58, and if the code is positive, the discrimination circuit 60 outputs a high-level signal, and outputs a low-level signal if the code is negative.

A description will now be given on the operation of this embodiment. The displacement caused by the vibration of the member 1 to be supported is detected by the displacement sensor 50, and the velocity $V_s$ of the member 1 to be supported is calculated by the differential circuit 54. Meanwhile, the displacement caused by the vibration of the base 4 is detected by the displacement sensor 52, and the velocity $V_u$ of the base 4 is calculated by the differential circuit 56. The adder 58 calculates the relative velocity $V_{rel} = V_s - V_u$ between the velocity $V_s$ of the member 1 to be supported and the velocity $V_u$ of the base 4. The discrimination circuit 60 discriminates whether the product $V_s \cdot V_{rel}$ between the velocity $V_s$ of the member 1 to be supported and the relative velocity $V_{rel}$ is positive or negative so as to determine whether the direction of the velocity $V_s$ of the member 1 to be supported and the direction of the relative velocity $V_{rel}$ are the same or different directions. Subsequently, the discriminations circuit 60 outputs a high-level signal if the velocity $V_s$ and the relative velocity $V_{rel}$ are oriented in the same direction, and outputs a low-level signals if they are oriented in opposite directions. When the high-level signal is outputted from the discrimination circuit 60, the driver 62 turns on the switch 13. As a result, a voltage is applied across the positive electrode plate 10 and the negative electrode plate 11, so that the viscosity of the electrorheological fluid becomes large, and the normal stress occurring in the electrorheological fluid at the time when an external force has acted thereon via the electrodes becomes large. Consequently, it is possible to transmit the vibrations from the base 4 to the member 1 to be supported. It should be noted that although an electric force acts between the electrode plates at that time, since it very small, it can be ignored. Meanwhile, the driver 62 turns off the switch 13 when the low-level signal is outputted from the discrimination circuit 60. As a result, since the voltage ceases to be applied between the electrode plates, the viscosity of the electrorheological fluid does not become large, and the normal stress occurring in the electrorheological fluid at the time when an external force has acted thereon does not become large. Hence, it is possible to attenuate the vibrations transmitted from the base 4 to the member 1 to be supported.

In a case where the relative velocity $V_{rel}$ is large, since it is necessary to positively effect transmission of vibrations, it is preferable to increase the voltage applied as the absolute value of the relative velocity $V_{rel}$ becomes larger.

In this vibration attenuator, the normal stress of the electrorheological fluid appearing in the normal direction of electrode surfaces is utilized in attenuating the vibrations. As compared with a conventional apparatus making use of a change in the viscosity of the electrorheological fluid, it is possible to display a vibration attenuating effect of 10-fold or more, and it is possible to substantially improve the characteristics of the apparatus. Furthermore, since the apparatus can be operated with a low applied voltage as compared with the conventional apparatus, the system can be simplified substantially.

Figure 2A:
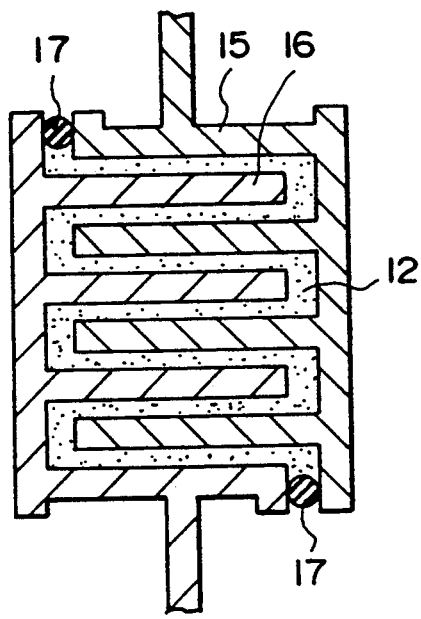
FIGS. 2A and 2B are cross-sectional views of other examples of electrodes used in the vibration attenuator shown in FIG. 1.

FIG. 2A is a cross-sectional view illustrating another example of the electrodes used in the vibration attenuator shown in FIG. 1. These electrodes are arranged such that positive electrode plates 15 and negative electrode plates 16 are arranged alternately, and the electrorheological fluid 12 is filled in each gap therebetween and is hermetically sealed by rubber seals 17 of which form a sealed chamber. As the electrodes arranged as described above are used in the vibration attenuator, the overall electrode area formed between respective pairs of the positive electrode plate 15 and the negative electrode plate 16 increases, with the result that the normal stress occurring in the electrorheological fluid 12 can be increased.

Figure 2B:
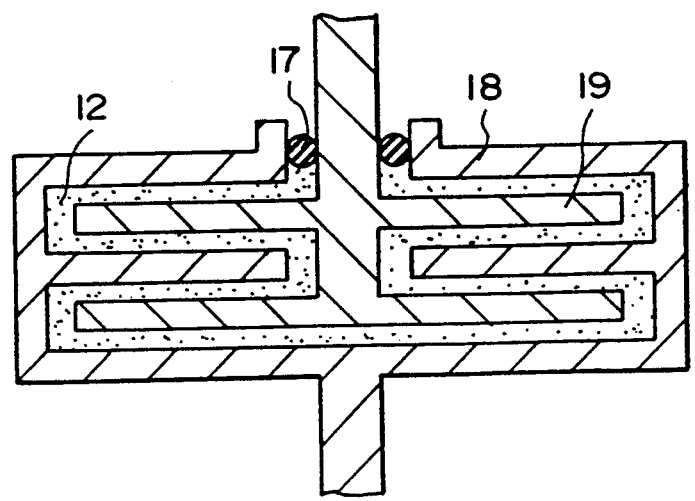

FIG. 2B is a cross-sectional view of still another example of the electrodes used in the vibration attenuator shown in FIG. 1. These electrodes are arranged such that the electrorheological fluid 12 is filled between each gap between positive electrode plates 18 and negative electrode plates 19 arranged alternately, and is hermetically sealed by the rubber seal 17 of which form a sealed chamber. In this example as well, the overall electrode area formed between respective pairs of the positive electrode plate 18 and the negative electrode plate 19 increases, with the result that the normal stress occurring in the electrorheological fluid 12 can be increased.

It should be noted that although in the above an example has been described in which parallel-arranged electrode plates are used, a cylindrical electrode and a bar electrode disposed in a central portion of the cylindrical electrode may be used.

Figure 3A:
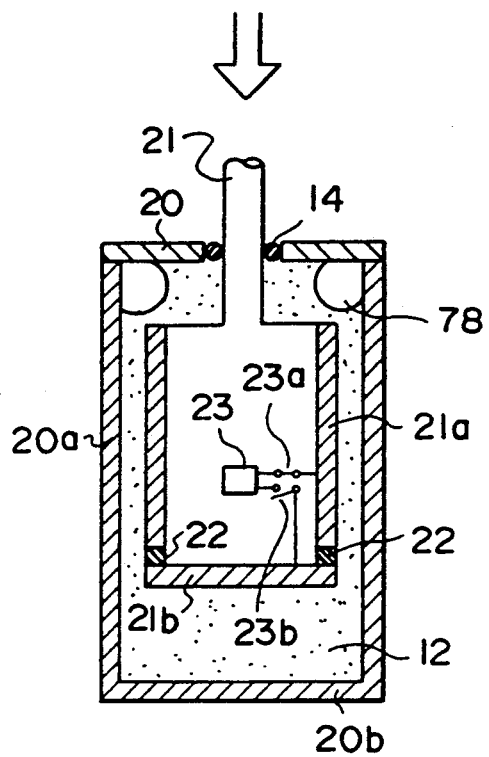
FIGS. 3A and 3B are schematic diagrams of an example in which the electrorheological fluid-applied vibration controller in accordance with the present invention is applied to a shock absorber (damper)
Figure 3B:
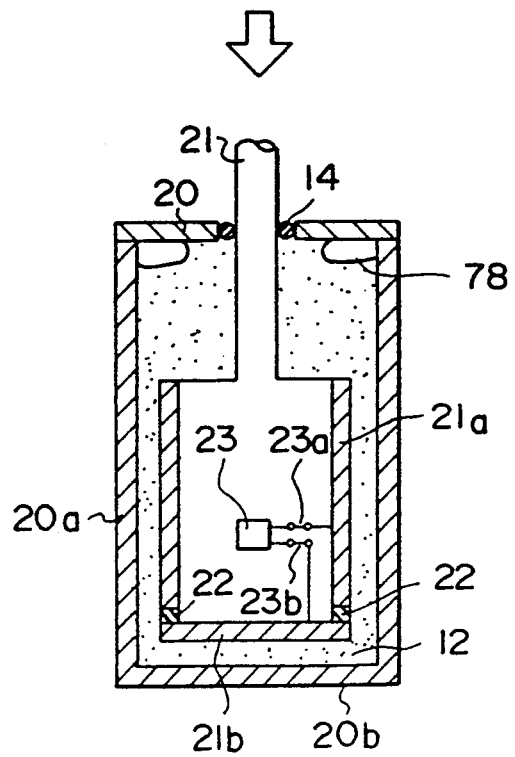

FIGS. 3A and 3B are schematic diagrams illustrating an example in which the electrorheological fluid-applied apparatus in accordance with the present invention is applied to a shock absorber (damper) as the electrorheological fluid-applied vibration controller. In FIGS. 3A and 3B, a side surface portion 20a and a bottom surface portion 20b of a cylindrical damper case 20 constitute negative electrodes, while a side surface portion 21a and a bottom surface portion 21b of a cylindrical piston 21 are separated by an insulator 22 and constitute positive electrodes, respectively. An accumulator 78 for absorbing a volume change caused by the movement of the piston 21 is disposed in the damper case 20. A power source 23 is disposed within the piston 21, and this power source 23 is electrically connected to the side surface portion 21a and the bottom surface portion 21b by means of a switch 23a and a switch 23b which is turned on when the piston 21 has approached the bottom surface portion 20b of the damper case 20. It should be noted that reference numeral 12 denotes the electrorheological fluid, and 14 denotes a rubber seal. The power source 23 may be disposed in a position other than in the piston 21.

In the case of the damper shown in FIGS. 3A and 3B, if a voltage is applied to the positive electrode constituted by the side surface portion 21a of the piston 21, as shown in FIG. 3A, the viscosity of the fluid between the side surface portions 20a and 21a normally increases, so that resistance occurs in the vertical movement of the piston 21, thereby making it possible to absorb a shock. Meanwhile, in a case where the piston 21 has approached the bottom surface portion 20b of the damper case 20, the switch 23b is closed, as shown in FIG. 3B, and if a voltage is applied to the bottom surface portion 20b of the damper case 20, a normal stress is imparted between the bottom surface portion 20b of the damper case 20 and the bottom surface portion 21b of the piston 21, so that it is possible to prevent the so-called bottom striking in which the piston 21 strikes against the bottom surface of the damper case 20.

Although in the above an example has been described in which electrodes separated by an insulator are provided on the piston, in the final analysis it suffices if the positive electrode(s) and the negative electrode(s) are provided in both the opposing side surface portions and in the opposing bottom surface portions in such a manner that different polarities face each other. In other words, electrodes separated by an insulator may be disposed on the damper case, or electrodes separated by an insulator may be disposed on both the piston and the damper case.

Figure 4A:
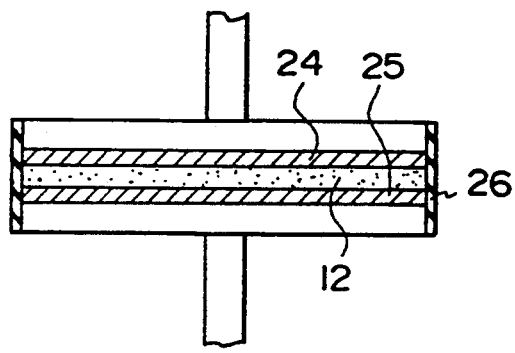
FIGS. 4A and 4B are schematic diagrams of other embodiments of the vibration attenuator.
Figure 4B:
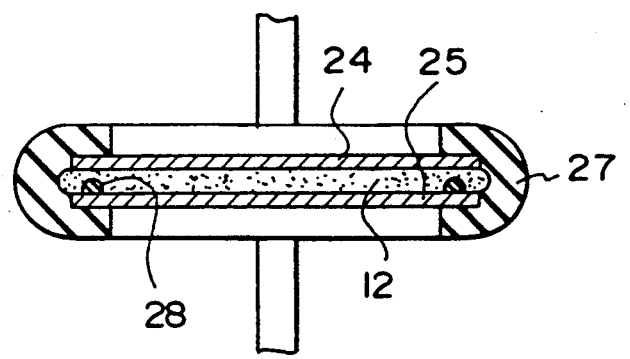

FIGS. 4A and 4B are schematic diagram illustrating other examples of the vibration attenuator as the electrorheological fluid-applied apparatuses in accordance with the present invention. In FIG. 4A, the electrorheological fluid 12 is filled in a gap between a positive electrode plate 24 and a negative electrode plate 25, the gap being selected by a rubber seal 26 thereby forming a sealed chamber. In this case, the vibration attenuator can be simplified, and if the rubber seal 26 is made thicker, the load can be supported by a vibration controlling portion of the vibration attenuation such that the rubber seal 26 holds the distance between the electrodes when no voltage is applied across the positive and negative electrodes.

In FIG. 4B, a rubber seal 27 having a semi-annular cross section is fitted in such a manner as to cover the peripheral edges of the positive electrode plate 24 and the negative electrode plate 25, and an insulating spacer 28 is secured to the side of the negative electrode plate 25. In this case, even when an excessive external force has acted on the electrorheological fluid 12 in the normal directions, it is possible to avoid a phenomenon in which the two electrode plates abut against each other. In addition, in a case where a voltage is not applied to the electrodes, the rubber seal 27 as a single unit can be made to exhibit the function of supporting a load so as to hold the distance between the positive and negative electrodes and attenuating vibrations.

Figure 5:
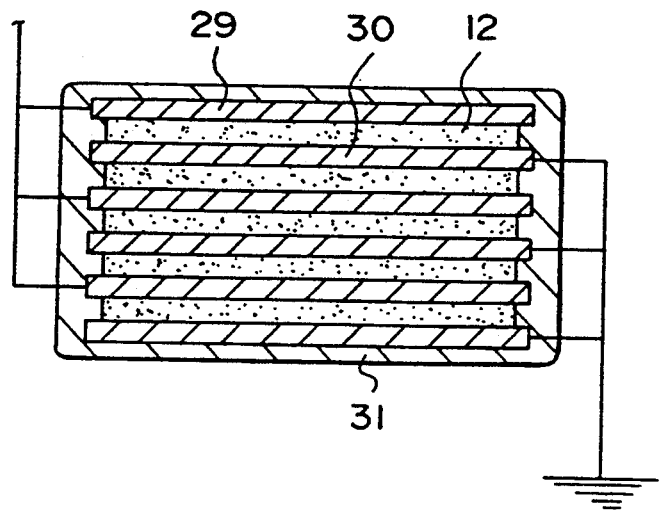
FIG. 5 is a schematic diagram of still another embodiment of the vibration attenuator in accordance with the present invention.

FIG. 5 is a schematic diagram illustrating still another example of the vibration attenuator as the electrorheological fluid-applied apparatus. In FIG. 5, positive electrode plates 29 and negative electrode plates 30 are arranged alternately, and the electrorheological fluid 12 is filled in each gap therebetween. All of these members are covered with a rubber sleeve 31. The rubber sleeve 31 works so as to hold the distance between the positive and negative electrode plates and to form a sealed chamber. In this vibration attenuator, when a voltage is applied across the electrodes, the modulus of elasticity in the vertical direction becomes much greater than the modulus of elasticity in the horizontal direction, so that it is possible to control vertical vibrations by a remarkable degree, while horizontal vibrations can be attenuated relatively softly.

Figure 6:
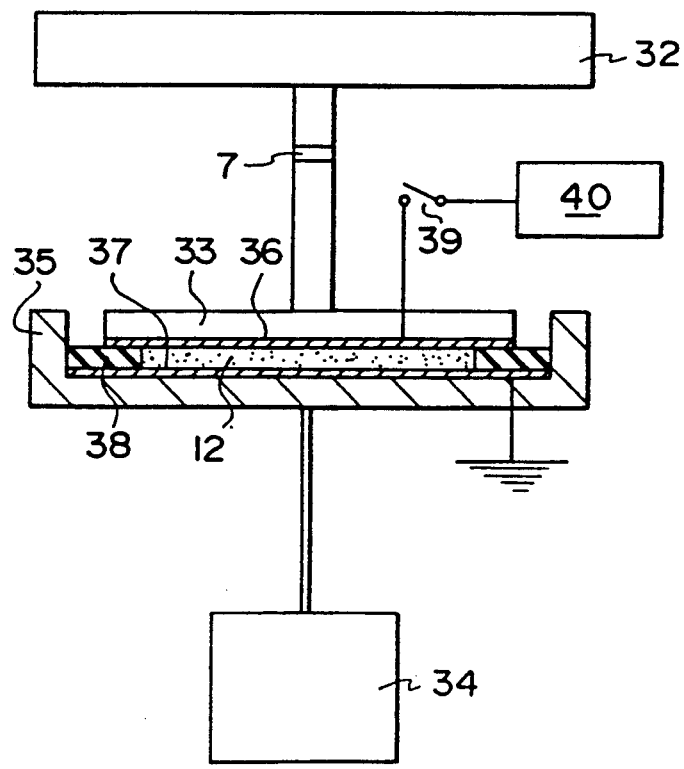
FIG. 6 is a schematic diagram of an apparatus for evaluating an electrorheological fluid-applied apparatus in accordance with the present invention.

FIG. 6 is a schematic diagram of an evaluating apparatus for evaluating the electrorheological fluid-applied apparatus in accordance with the present invention. In this apparatus, a positive electrode plate 36 and a negative electrode plate 37 are attached to an opposing surface of piston 33 connected to a fixedly supporting portion 32 and an opposing surface of a case 35 to which a load 34 is connected, respectively. The electrorheological fluid 12 is filled between the electrodes, and a spacer 38 is disposed therebetween. The positive electrode plate 36 is electrically connected to a power source 40 via a switch 39, while the negative electrode plate 37 is grounded.

In this apparatus, when a voltage is applied across the electrodes, the stress appearing in the electrorheological fluid 12 is balanced with the gravity of the load, thereby making it possible to ascertain the phenomenon in which the electrorheological fluid 12 is capable of holding the load.

It was experimentally verified that in a case where a fluid containing 26% (vol. %) of carbonaceous powders in silicone oil is used as the electrorheological fluid, it is possible to hold a weight of 50 grams or more per square centimeter of an electrode surface with an electric field strength of 2 kV/mm. When the voltage is cut off, the load 34 falls down. With respect to the phenomenon in which the stress declines gradually while the weight is being held at that time, i.e., with respect to the alleviation of the stress, since the relaxation speed is slow, no problem would be encountered in practical applications. However, it is possible to control the relaxation speed by adjusting the volume ratio of the powders in the electrorheological fluid and/or the viscosity of the oil. To make up for the relaxation of the stress, the applied voltage may be gradually increased. In addition, by making use of such phenomena, the electrorheological fluid-applied apparatus can be applied to a fixing apparatus for a pick-and-place type robot, a structure-supporting member, or the like. Furthermore, the apparatus itself shown in FIG. 6 may be used as a fixing apparatus.

Figure 7:
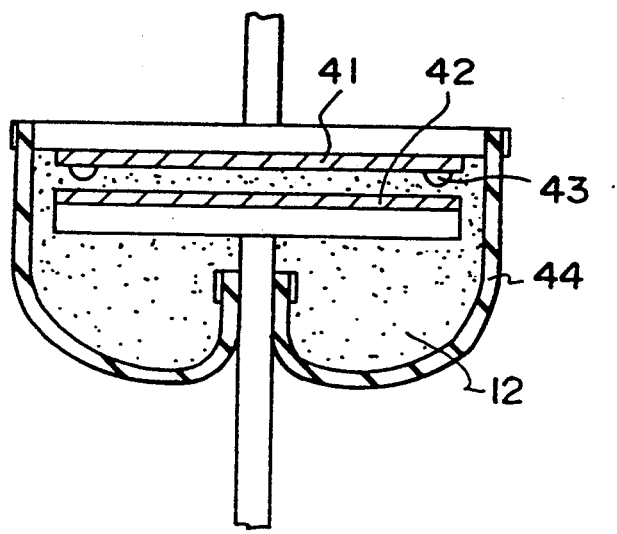
FIG. 7 is a schematic diagram of a further embodiment of the vibration attenuator as an example of the electrorheological fluid-applied apparatus.
Figure 8:
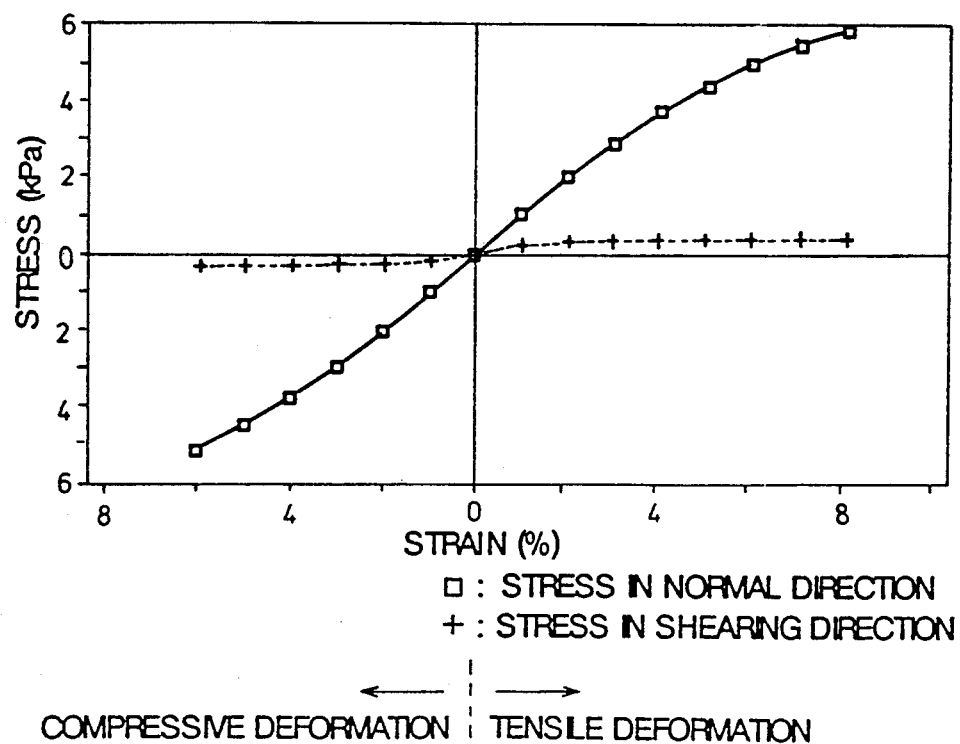
FIG. 8 is a graph illustrating stress-strain curves in the normal direction and the shearing direction of an electrorheological fluid in accordance with the present invention.
Figure 9:
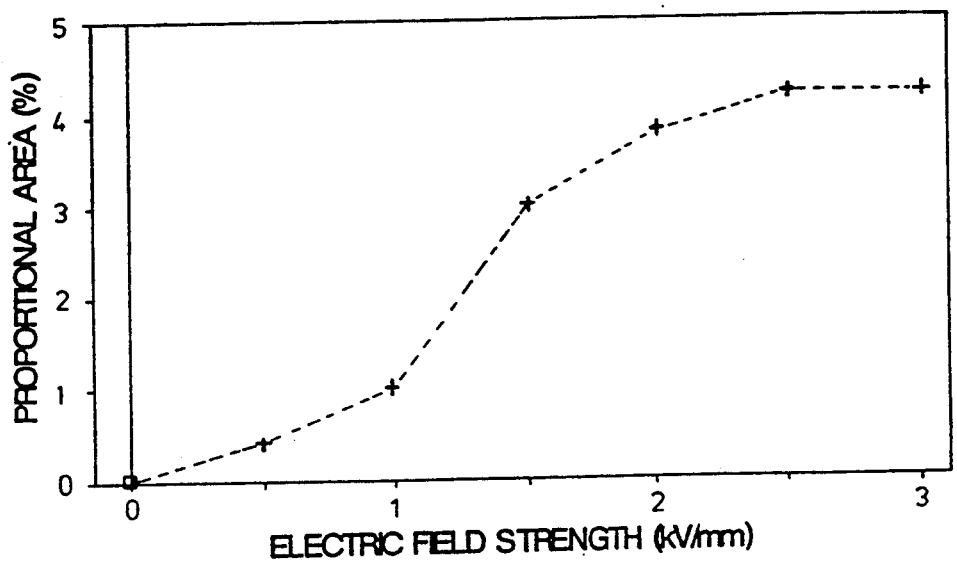
FIG. 9 is a characteristic diagram illustrating the relationship between the electric field strength of applied voltage and a proportional area in the stress-strain behavior in the normal direction of the electrorheological fluid in accordance with the present invention.
Figure 10:
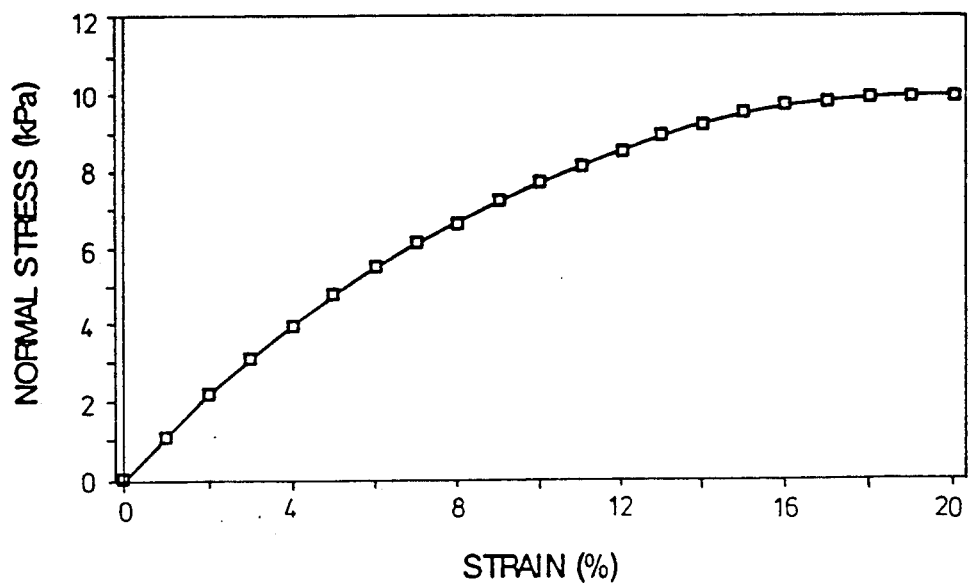
FIG. 10 is a graph illustrating stress-strain curves in the tensile deformation in the normal direction of the electrorheological fluid in accordance with the present invention.
Figure 11:
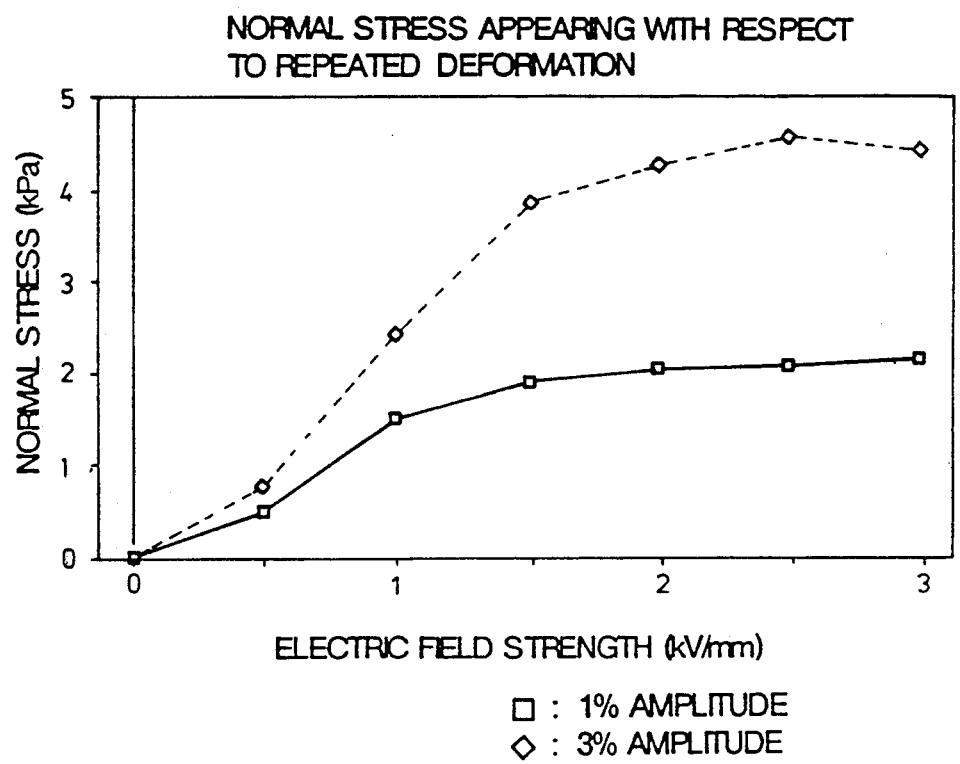
FIG. 11 is a characteristic diagram of the electrorheological fluid in accordance with the present invention.

FIG. 7 is a schematic diagram illustrating a further embodiment of the electrorheological fluid-applied fixing apparatus as the electrorheological fluid-applied apparatus. In FIG. 7, a positive electrode plate 41 and a negative electrode plate 42 face each other, and a spacer 43 is secured to the positive electrode plate 41. In addition, one end of a rubber sleeve 44 is secured to an outer peripheral edge of the positive electrode plate 41, and the other end of the rubber sleeve 44 is secured to a bar-shaped portion of the negative electrode plate 42. The electrorheological fluid 12 is filled in the rubber sleeve 44. As a result, the positive electrode plate, the negative electrode plate, and the electrorheological fluid are accommodated in the rubber sleeve 44.

In the fixing apparatus shown in FIG. 7, by applying a voltage to the electrodes, the piston to which the negative electrode plate 42 is connected can be secured with a desired strength to the case connected to the positive electrode plate 41. By cutting off the voltage, the normal stress acting between the two electrode plates 41, 42 is canceled, and the operating shaft of the piston connected to the negative electrode plate 42 is released freely. In this embodiment, the spacer is not essential, and the positive electrode plate 41 can be held at a predetermined distance away from the negative electrode plate 42 without the spacer depending on a method of application of the voltage.

It should be noted that the electrodes described in connection with the vibration attenuator may be used for the fixing apparatus, and the electrodes described in connection with the fixing apparatus may be used for the vibration attenuator. In addition, the electrorheological fluid in the present invention is not restricted to that of the above-described embodiments, and a known electrorheological fluid may be used. As this electrorheological fluid, it is possible to use, for instance, one in which hydrous or semiconductive powders whose desired particle diameter and the like have been selected are contained in an oil or the like with an appropriate powder concentration. In this case, as dispersive powders, it is possible to use, for instance, polymethacrylate lithium, silica, polyacenquinone, carbonacenous powders, or the like. In addition, as the particle diameter of the powders, a range of 1-20 microns or thereabouts is suitable, and a range of 10-50% is sufficient as the powder concentration in the oil.

What is claimed is:

1. An electrorheological fluid-applied apparatus, comprising:
   a positive electrode and a negative electrode disposed in face-to-face relationship, at least one of said positive electrode and said negative electrode being displaceable in a direction in which a distance between said electrodes changes;
   voltage applying means for applying a voltage across said positive and negative electrodes;
   an electrorheological fluid disposed between said positive and negative electrodes and adapted to undergo a change in a characteristic of its own when the voltage is applied across said positive and negative electrodes, so as to control a change in the distance between said electrodes by means of a normal stress occurring in the electrorheological fluid as a result of an action of an external force thereon; and
   elastic holding means for holding the distance between said electrodes in a state in which no voltage is applied across said positive and negative electrodes, said holding means sealing a space between said positive and negative electrodes thereby forming a sealed chamber such that the electrorheological fluid is filled between said positive and negative electrodes and within said sealed chamber.

2. An electrorheological fluid-applied apparatus, comprising:
   a positive electrode and a negative electrode disposed in face-to-face relationship, at least one of said positive electrode and said negative electrode being displaceable in a direction in which a distance between said electrodes changes;
   voltage applying means for applying a voltage across said positive and negative electrodes;
   an electrorheological fluid disposed between said positive and negative electrodes and adapted to undergo a change in a characteristic of its own when the voltage is applied across said positive and negative electrodes, so as to control a change in the distance between said electrodes by means of a normal stress occurring in the electrorheological fluid as a result of an action of an external force thereon;
   elastic holding means for holding the distance between said electrodes in a state in which not voltage is applied across said positive and negative electrodes, said holding means accommodating therein said positive and negative electrodes and the electrorheological fluid and, wherein said elastic holding means and said electrodes form a sealed chamber containing said electrorheological fluid.

3. An electrorheological fluid-applied apparatus according to claim 2, wherein a plurality of positive electrodes and a plurality of negative electrodes are arranged alternatively, and the electrorheological fluid is filled between said electrodes.

4. An electrorheological fluid-applied vibration controller, comprising:
   a positive electrode and a negative electrode disposed in face-to-face relationship, at least one of said positive electrode and said negative electrode being displaceable in a direction in which a distance between said electrodes changes;
   voltage applying means for applying a voltage across said positive and negative electrodes;
   an electrorheological fluid disposed between said positive and negative electrodes and adapted to undergo a change in a characteristic of its own when the voltage is applied across said positive and negative electrodes, so as to transmit an external force from one of said positive and negative electrodes to the other by means of a normal stress occurring in the electrorheological fluid as a result of an action of the external force thereon; and
   elastic holding means for holding the distance between said electrodes in a state in which no voltage is applied across said positive and negative electrodes, said holding means sealing a space between said positive and negative electrodes thereby forming a sealed chamber such that the electrorheological fluid is filled between said positive and negative electrodes and within said sealed chamber.

5. An electrorheological fluid-applied vibration controller according to claim 4, wherein one of said positive and negative electrodes is connected to a vibration generating portion, and the other is connected to a vibration receiving portion, said electrorheological fluid-applied vibration controller further comprising:
   first velocity-detecting means for detecting a velocity of said vibration generating portion;
   second velocity detecting means for detecting a velocity of said vibration receiving portion;
   discriminating means for discriminating a direction of the velocity of said vibration receiving portion and a direction of a relative velocity of said vibration receiving portion with respect to said vibration generating portion; and
   control means for controlling voltage applied to the positive and negative electrodes such that the voltage is applied across said positive and negative electrodes when the direction of the velocity of said vibration receiving portion and the direction of the relative velocity are oriented in the same direction, and the voltage is not applied across said positive and negative electrodes when the direction of the velocity of said vibration receiving portion and the direction of the relative velocity are oriented in opposite directions.

6. An electrorheological fluid-applied vibration controller according to claim 5, wherein said control means increases the voltage applied across said positive and negative electrodes as the relative velocity increases when the direction of the velocity of said vibration receiving portion and the direction of the relative velocity are oriented in the same direction.

7. An electrorheological fluid-applied vibration controller, comprising:
   a positive electrode and a negative electrode disposed in face-to-face relationship, at least one of said positive electrode and said negative electrode being displaceable in a direction in which a distance between said electrodes changes;
   voltage applying means for applying a voltage across said positive and negative electrodes;
   an electrorheological fluid disposed between said positive and negative electrodes and adapted to undergo a change in a characteristic of its own when the voltage is applied across said positive and negative electrodes, so as to transmit an external force from one of said positive and negative electrodes to the other by means of a normal stress occurring in the electrorheological fluid as a result of an action of the external force thereon;

elastic holding means for holding the distance between said electrodes in a state in which no voltage is applied across said positive and negative electrodes, said holding means accommodating therein said positive and negative electrodes and the electrorheological fluid and wherein said elastic holding means and said electrodes form a sealed chamber containing said electrorheological fluid.

8. An electrorheological fluid-applied vibration controller according to claim 7, wherein a plurality of positive electrodes and a plurality of negative electrodes are arranged alternately, and the electrorheological fluid is filled between said electrodes.

9. An electrorheological fluid-applied vibration controller according to claim 7, wherein one of said positive and negative electrodes is connected to a vibration generating portion, and the other is connected to a vibration receiving portion, said electrorheological fluid-applied vibration controller further comprising:

first velocity-detecting means for detecting a velocity of said vibration generating portion;

second velocity-detecting means for detecting a velocity of said vibration receiving portion;

discriminating means for discriminating a direction of the velocity of said vibration receiving portion and a direction of a relative velocity of said vibration receiving portion with respect to said vibration generating portion; and control means for controlling voltage applied to the positive and negative electrodes such that the voltage is applied across said positive and negative electrodes when the direction of the velocity of said vibration receiving portion and the direction of the relative velocity are oriented in the same direction, and the voltage is not applied across said positive and negative electrodes when the direction of the velocity of said vibration receiving portion and the direction of the relative velocity are oriented in opposite directions.

10. An electrorheological fluid-applied vibration controller according to claim 9, wherein said control means increases the voltage applied across said positive and negative electrodes as the relative velocity increases when the direction of the velocity of said vibration receiving portion and the direction of the relative velocity are oriented in the same direction.

11. An electrorheological fluid-applied vibration controller, comprising:

a positive electrode and a negative electrode disposed in face-to-face relationship, at least one of said positive electrode and said negative electrode being displaceable in a direction in which a distance between said electrodes changes;

voltage applying means for applying a voltage across said positive and negative electrodes;

an electrorheological fluid disposed between said positive and negative electrodes and adapted to undergo a change in a characteristic of its own when the voltage is applied across said positive and negative electrodes, so as to transmit an external force from one of said positive and negative electrodes to the other by means of a normal stress occurring in the electrorheological fluid as a result of an action of the external force thereon;

a case;

a piston accommodated movably in said case; and another positive electrode and another negative electrode, wherein one of said positive electrode and said negative electrode is disposed in a bottom surface of said case, and the other one thereof is disposed in a bottom surface of said piston, and wherein one of said another positive electrode and said another negative electrode is disposed in a side surface of said case, and the other one thereof is disposed in a side surface of said piston, the electrorheological fluid being filled between said case and said piston.

12. An electrorheological fluid-applied fixing apparatus, comprising:

a positive electrode and a negative electrode disposed in face-to-face relationship, at least one of said positive electrode and said negative electrode being displaceable in a direction in which a distance between said electrodes changes;

voltage applying means for applying a voltage across said positive and negative electrodes;

an electrorheological fluid disposed between said positive and negative electrodes and adapted to undergo a change in a characteristic of its own when the voltage is applied across said positive and negative electrodes, so as to hold in opposition to an external force acting on the electrorheological fluid a relative position of one of said positive and negative electrodes with respect to the other by means of a normal stress occurring in the electrorheological fluid as a result of the action of the external force; and elastic holding means for holding the distance between said electrodes in a state in which no voltage is applied across said positive and negative electrodes, said holding means sealing a space between said positive and negative electrodes thereby forming a sealed chamber such that the electrorheological fluid is filled between said positive and negative electrodes and with said sealed chamber.

13. An electrorheological fluid-applied fixing apparatus, comprising:

a positive electrode and a negative electrode disposed in face-to-face relationship, at least one of said positive electrode and said negative electrode being displaceable in a direction in which a distance between said electrodes changes;

voltage applying means for applying a voltage across said positive and negative electrodes;

an electrorheological fluid disposed between said positive and negative electrodes and adapted to undergo a change in a characteristic of its own when the voltage is applied across said positive and negative electrodes, so as to hold in opposition to an external force acting on the electrorheological fluid a relative position of one of said positive and negative electrodes with respect to the other by means of a normal stress occurring in the electrorheological fluid as a result of the action of the external force;

elastic holding means for holding the distance between said electrodes in a state in which no voltage is applied across said positive and negative electrodes, said holding means accommodating therein said positive and negative electrodes and the electrorheological fluid and, wherein said elastic holding means and said electrodes form a sealed chamber containing said electrorheological fluid.

14. An electrorheological fluid-applied fixing apparatus according to claim 13, wherein a plurality of positive electrodes and a plurality of negative electrodes are arranged alternately, and the electrorheological fluid is filled between said electrodes.

\* \* \* \* \*